June 17, 1941.  H. H. KERR  2,245,682
BRAKE
Filed May 9, 1938   5 Sheets-Sheet 1

INVENTOR.
HENRY H. KERR
BY Jerome R. Cox
ATTORNEY.

June 17, 1941.  H. H. KERR  2,245,682
BRAKE
Filed May 9, 1938  5 Sheets-Sheet 2

INVENTOR.
HENRY H. KERR
BY Jerome R. Cox.
ATTORNEY.

INVENTOR.
HENRY H. KERR.
BY Jerome R Cox
ATTORNEY.

Patented June 17, 1941

2,245,682

UNITED STATES PATENT OFFICE 2,245,682

BRAKE

Henry H. Kerr, South Bend, Ind., assignor to Bendix Products Corporation, South Bend, Ind., a corporation of Indiana Application May 9, 1938, Serial No. 206,703

13 Claims. (Cl. 188—152)

This invention relates to brakes and more particularly to fluid brake systems in which a fluid is used to force the brake shoes or friction materials against a brake drum to obtain braking power.

Heretofore, fluid brake systems have been proposed and used in which safety devices have been incorporated. These systems, however, do not insure the operation of all brakes, but insure only the operation of those brakes in which no failure of parts has taken place. These systems may be safely used in many cases, but in other instances such as in aircraft braking, after landing, they are wholly inadequate as safety measures. Aircraft brakes are often used to steer the aircraft and should one brake fail and the other operate while braking, the braking action will itself tend to turn abruptly the airplane or even to tip it.

In this invention I propose to eliminate this risk by using two or more separate actuating means for each individual brake and provide that even though one actuator fails, the brake may still be operable by means of the other actuator or actuators.

One of the objects of this invention is to provide a fluid brake system whereby each brake is applied by two or more separate actuating means.

Another object of the invention is to provide a fluid brake system with two or more separate actuators for each individual brake, one or more of which will still operate the brake even though the other actuators fail.

One of the features of the invention is a fluid twinplex brake which is operable as a twinplex brake under all ordinary conditions, but if one of the actuators should fail, the brake becomes operable as a double anchor non-servo brake.

A further feature of the invention is a fluid brake system that has two or more expansible tubes filled with fluid, said tubes being used to force the brake lining against the brake drum as a controlled fluid pressure is used to expand them. Individual controlling means for each tube or group of tubes is used. The system is so constructed that if one tube or group of tubes fail, the other tube or group of tubes is still able to operate the brake.

Further objects and features of the invention will be apparent after a study of the following specification and claims, and of the attached drawings of which:

Figures 1, 2:
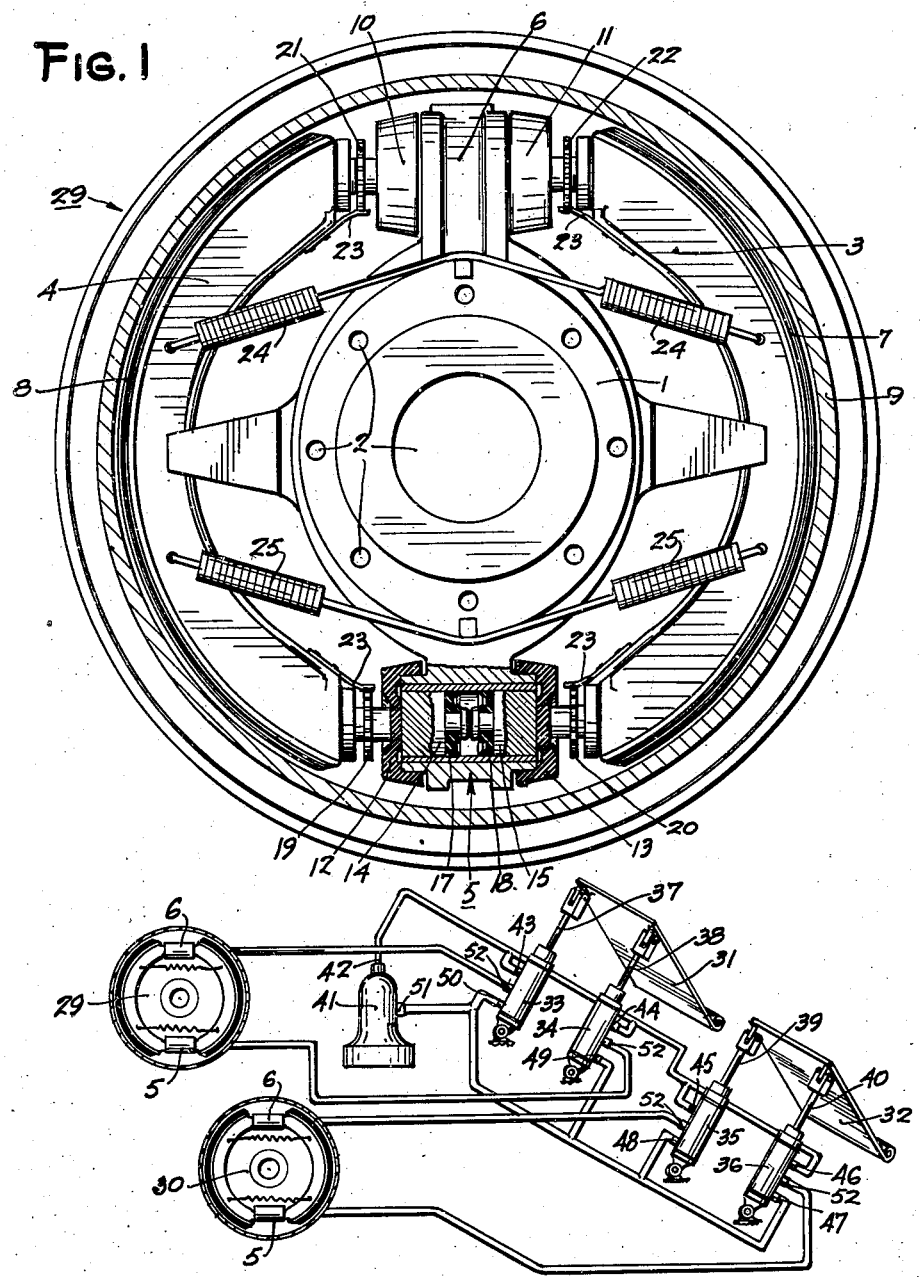
Figure 1 is a side view of a twinplex brake which may be used with my invention.
Figure 2 is a diagrammatic view of a braking system on an airplane constructed according to my invention.

Referring in detail to the drawings, Figure 1 shows a hydraulically actuated twinplex brake with a spider 1 provided with holes 2 to mount the brake to the axle of a vehicle or aircraft. Brake shoes 3 and 4 are anchored on caps 10, 11, 12 and 13 that fit over the ends of hydraulic wheel cylinders 5 (shown in section) and 6. The hydraulic wheel cylinders 5 and 6 are each provided with two pistons 14 and 15, two rubber cups 17 and 18 and end caps such as 10 and 11, and 12 and 13. At each end of the shoes 3 and 4 are adjustments such as 20 and 22, and 19 and 21 respectively. Brake linings 7 and 8 are also attached to shoes 3 and 4 respectively. The adjustments are latched by springs 23 at all times except when manually adjusted. The brake is normally held in the off position by means of springs 24 and 25.

In operation when fluid is forced into the fluid wheel cylinders 5 and 6, the pistons in both cylinders move outwards together with the caps 10, 11, 12 and 13 and the adjustments 19, 20, 21 and 22. The brake shoes 3 and 4, carrying the brake linings 7 and 8 respectively, are then forced outward against the spring pressure of the springs 24 and 25 and into contact with the brake drum 9. If the rotation of the drum 9 is clockwise, the shoe 3 will anchor on the cap 13 and the shoe 4 will anchor on the cap 10. If the rotation, however, is in the opposite direction, the shoe 4 will anchor on the cap 12 and the shoe 3 will anchor on the cap 11.

In Figure 2, a fluid brake system for an airplane embodying the idea of the invention is shown. The brakes 29 and 30 (one of which is shown in detail in Figure 1) are controlled by means of two foot pedals 31 and 32 which may operate control valves such as 33, 34, 35 and 36 through connecting links 37, 38, 39 and 40 respectively. Fluid under pressure enters control valves 33, 34, 35 and 36 from a compressor 41 having an outlet 51 into the inlets 47, 48, 49 and 50 of the control valves 33, 34, 35 and 36. The fluid normally returns to the inlet 42 of the compressor 41 from the outlets 43, 44, 45 and 46 of the control valves 36, 35, 34 and 33. The fluid wheel cylinders 6 and 5 of brake 29 and 6 and 5 of brake 30 receive fluid from the control valves 33, 34, 35 and 36 when these control valves are opened.

Figure 5:
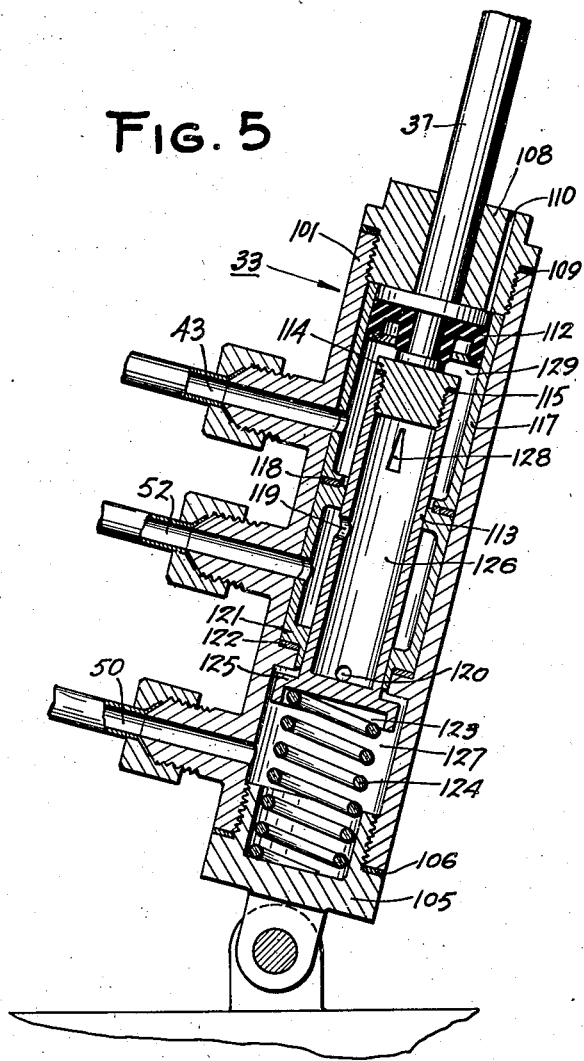
Figure 5 is a detailed view in section of one of the control valves shown in the braking systems illustrated in Figures 2 and 3 which may be used with my valve.

The control valves 33, 34, 35 and 36 are alike and the description of the one valve 33 will suffice for all (see Figure 5). The control valve 33 has a valve body 101 having a high pressure inlet 50, an outlet 52 leading to the braking system, and a return port 43 by which fluid may return to the compressor. The control valve 33 is sealed at one end by a cap 105 (provided with a gasket 106) screwed into the valve housing 101. A plug 108 provided for the opposite end has an air vent 110 provided in order to break up any vacuum which might otherwise develop between the plug 108 and a plunger 37 provided for chamber 129 formed in the valve body 101. The plunger 37 is fitted with a rubber cup seal 112 and extends into the chamber 129. An inner plunger 113 has a plug 114 provided with a gasket 115 to seal a chamber 126 running along the length of the plunger 113 and concentric to its outer diameter, and at the other end, the plunger 113 has a flange 125 extending into a compartment 127 of the valve housing 101. The flange 125 has a recess 123 provided as a spring seat for a spring 124. Near the plugged end of the chamber 126 there is a tapered orifice 128 and at the other end of the chamber 126 there is a small drilled hole 120 through the side wall of the inner plunger 113. From the chamber 126 of the inner plunger 113, an outlet 119 is provided to communicate with the outlet 52 of the valve 101. Two adapters 117 and 121, provided with gaskets 118 and 122 respectively, act as spacers and furnish bearing surface for the inner plunger 113 and the outer plunger 37.

In operating the control valve, fluid under pressure is introduced into the chamber 127 through the inlet 50. The fluid under pressure together with the spring 124 keeps the valve in the off position. When the outer plunger 37 is pushed inward toward the valve body 101, the port 120 of the chamber 126 is uncovered and allows fluid to flow into the chamber 126 and then through ports 119 and 52 respectively into the braking system. The tapered orifice 128 regulates the pressure as it is restricted to a greater or lesser degree by the movement of the plunger 37 which governs the movement of the inner plunger 113. From the orifice 128 the fluid flows into the chamber 129 and through the outlet 43 back to the compressor.

Figure 3:
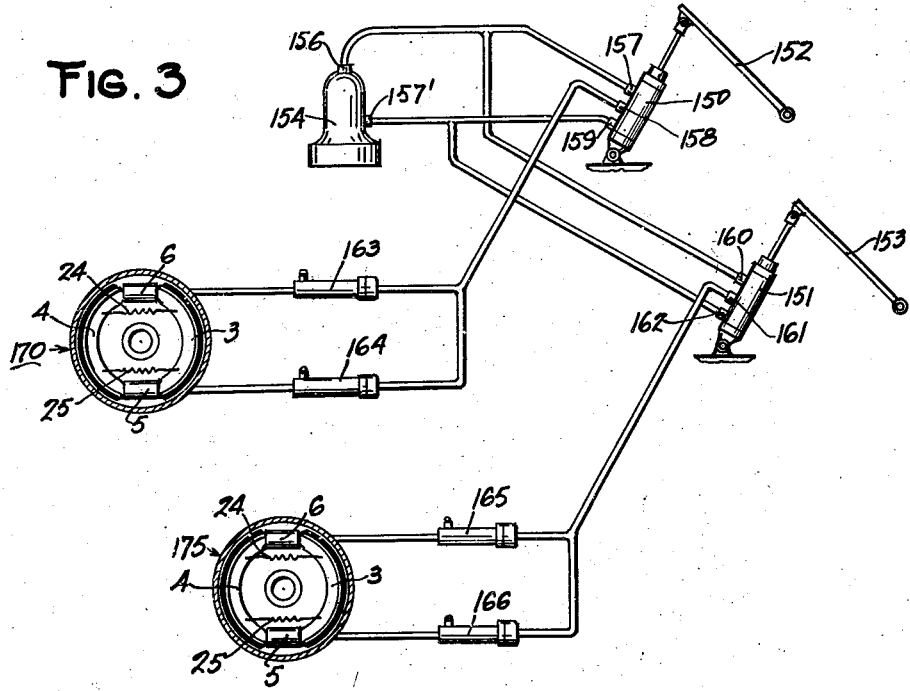
Figure 3 is a diagrammatic view of a braking system different from that shown in Figure 2 but still embodying the idea of my invention.
Figure 4:
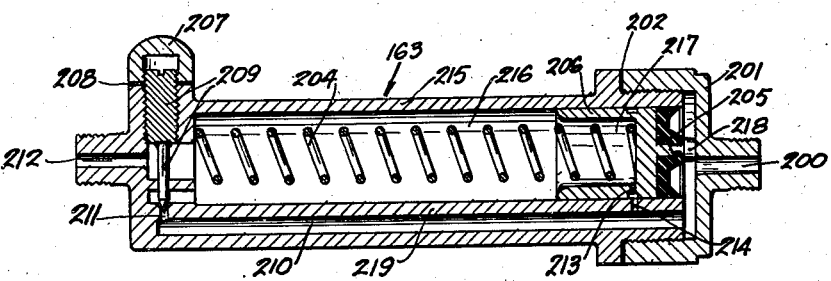
Figure 4 is a detailed view in section of a safety valve for a hydraulic brake system which may be used with my invention as shown in Figure 3.
Figure 9:
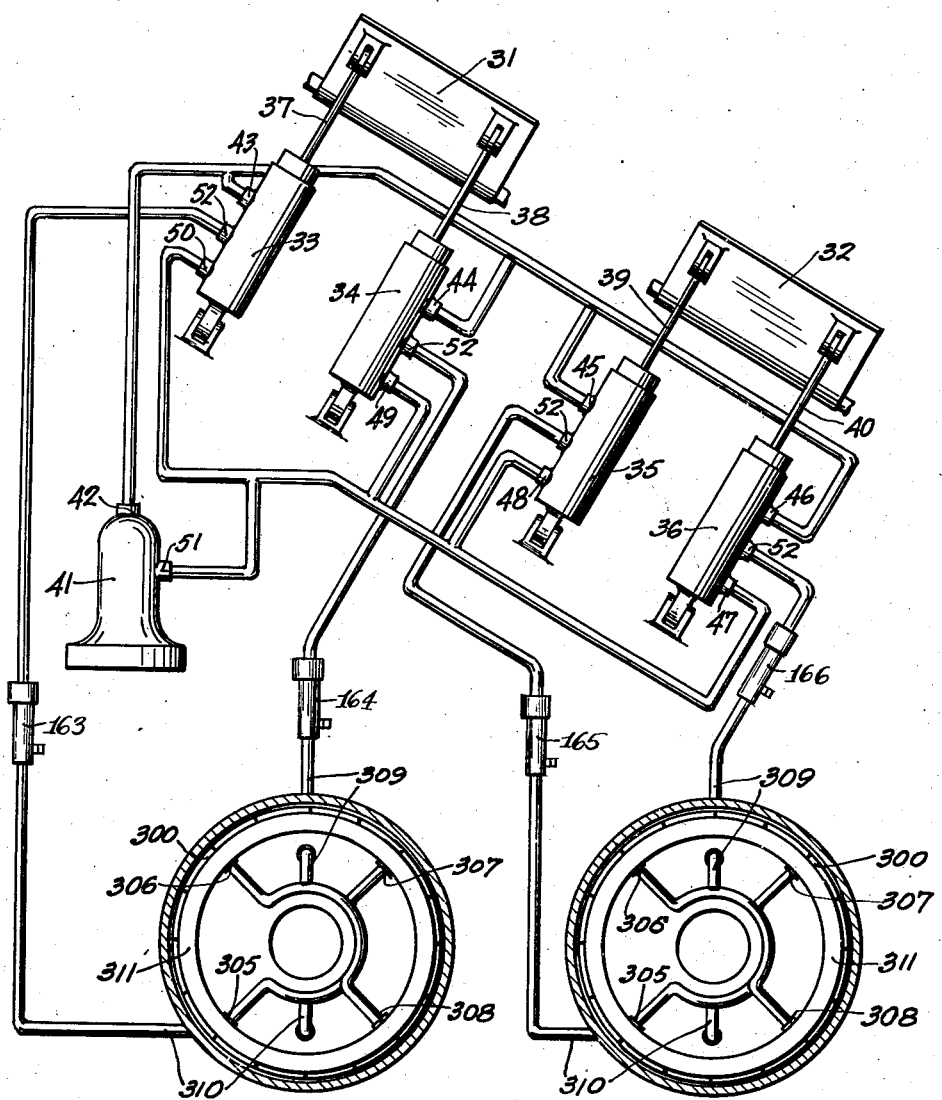
Figure 9 is a diagrammatic view of a braking system of an airplane constructed according to my invention utilizing a pressure control system similar to that shown in Figure 2 and utilizing brakes of the form shown in Figure 8.

In operating the braking system shown in Figure 2, when the control pedals 31 and 32 are depressed, the control valves 33, 34, 35 and 36 permit fluid to flow to fluid actuators 5 and 6 of brake 29 and 5 and 6 of brake 30, forcing the shoes 3 and 4 of brake 29 and 3 and 4 of brake 30 against the brake drum (not shown). If the brake 29 is operated while the rotation of the brake drum (not shown) is clockwise, the shoe 3 will anchor on the fluid cylinder 5 and the shoe 4 will anchor on the fluid wheel cylinder 6. This type of brake is commonly called a twinplex brake. When cut-off valves of the type shown in Figures 3, 4, and 9 are placed between the control valves and the wheel cylinders. If the fluid wheel cylinder 5 or the control valve 34 should fail, the brake would still be operable by means of the control valve 33 and the fluid wheel cylinder 6. In this case both shoes 3 and 4 will anchor on the fluid wheel cylinder 5. This type of brake is commonly called a double anchor non-servo brake.

In the braking system shown in Figure 3, safety valves such as valves 163, 164, 165 and 166 may be used. These safety valves are alike and detailed description of one will suffice. The valve 163 consists of a valve body 215 (see Figure 4) having a chamber 216 and a by-pass 210, both running lengthwise throughout the length of the valve body 215. The chamber 216 is fitted with a piston 206 provided with a rubber seal 205 at one end, and has at the other end a recess 217 for a spring 204 which holds the safety valve in released position by means of the stop 218 against the cap 201. Said cap 201 has an inlet port 200 and seals the valve body 215 by means of a gasket 202. At the extreme end opposite the piston, in the chamber 216, when the valve is in the off position, a needle valve is provided from the by-pass 210 to the chamber 216. The needle valve cooperates with a port 211 and consists of a valve stem 209 tapered at one end and threaded at the other, the tapered end fitting into the port 211 and effective in sealing it. A cap 207 and a gasket 208 are used to seal the valve body 215 at the needle valve. A port 212 is furnished as an outlet to the braking system. Through the wall 219 between the chamber 216 and a by-pass 210, a port 214 is provided to register with a port 213 in the piston 206 and allows fluid to flow into the chamber 216 when the piston is in the released position.

In operation the port 211 is always closed by the needle valve 209 and is opened only for bleeding the system initially. Fluid under pressure flows into the safety valve through the port 200 and acts on the piston 206 and forces it further into the chamber 216. Normally the system beyond the piston is sealed except for the ports 213 and 214 which are in communication only when the valve is in the released position. If the system leaks beyond the safety valve, only the fluid beyond the piston 206 is lost when the brake is applied.

The hydraulic braking system shown in Figure 3 has only two control valves 150 and 151 instead of four as that shown in Figure 2. This system, however, has the four safety valves 163, 164, 165 and 166 (valve 163 is shown in detail in Figure 4). The control valves 150 and 151 (similar to valve 33 shown in detail in Figure 5) are operated by means of two foot pedals 152 and 153 respectively. Fluid under pressure flows from a compressor 154 through an outlet 156 to inlets 157 and 168 of control valves 150 and 151 respectively. If the control valves 150 and 151 are in the open position fluid flows to safety valves 163 and 164, and 165 and 166 respectively from ports 158 and 161 of the control valves 150 and 151 respectively. The safety valves 163 and 164, and 165 and 166 are connected to wheel cylinders 6 and 5 of a brake 170 and with wheel cylinders 6 and 5 of a brake 175. Brakes 170 and 175 are similar to the brake shown in detail in Figure 1. From the control valves 150 and 151, fluid returns to the compressor 154 by means of outlets 159 and 162 of the control valves 150 and 151 respectively to an inlet 157' of the compressor 154.

In operation when the pedals 152 and 153 are depressed, they operate control valves 150 and 152 and allow fluid to flow to the safety valves 163 and 164, and 165 and 166 respectively. From the safety valves 163 and 164, and 165 and 166, fluid flows to the wheel cylinders 6 and 5 of brake 170, and 6 and 5 of brake 175 respectively. The wheel cylinders 5 and 6 of each brake force the shoes 3 and 4 against a brake drum (not shown).

In ordinary operation when the brake drum (not shown) is turning in a clockwise direction and the brake 170 is applied, the brake shoe 3 anchors on the wheel cylinder 5 and the brake shoe 4 anchors on the wheel cylinder 6. This type of brake is called a twinplex brake. If, however, part of the system should fail between the safety valve 165 and the wheel cylinder 6, the brake 175 would still be operable. Under the foregoing conditions, the shoe 3 would anchor on the wheel cylinder 6 and the shoe 4 would also anchor on the wheel cylinder 6, regardless of the rotation of the brake drum (not shown). This type of brake is known as a non-servo double anchor brake, and is in popular use at the present time.

Figure 6:
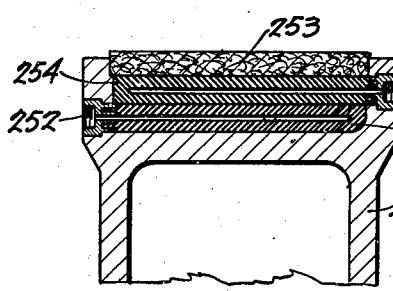
Figure 6 is a cross-sectional view of an alternate form of tube type brake arranged to embody the idea of my invention.

The brake shown in cross-section in Figure 6 is a tube type brake and also embodies my invention. A rim 251 has a recess running around its entire periphery, said recess contains two circular rubber tubes 254 and 255, mounted one above the other. The tubes 254 and 255 have a port 260 and 252 respectively, and have relatively short segments of linings 253 mounted in the rim 251 immediately above.

Figure 7:
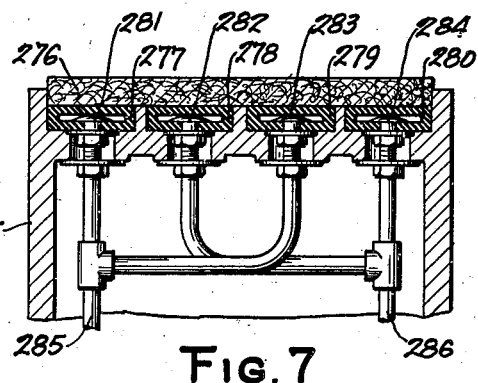
Figure 7 is a cross-sectional view of still another form of tube type brake also arranged to embody the idea of my invention.

The brake shown in cross-section in Figure 7 is a tube type brake also embodying my invention. Four circular rubber tubes 277, 278, 279 and 280 are mounted in individual recesses that run around the entire periphery of the rim 275. Above these rubber tubes 277, 278, 279 and 280 are short segments of linings 276 which cover an equal portion of all four rubber tubes. Each tube 277, 278, 279 and 280 has an inlet 281, 282, 283 and 284 respectively. The inlets 281 and 283 have a common source of fluid through conduit 285 and inlets 282 and 284 have a common source of fluid through conduit 286.

Figure 8:
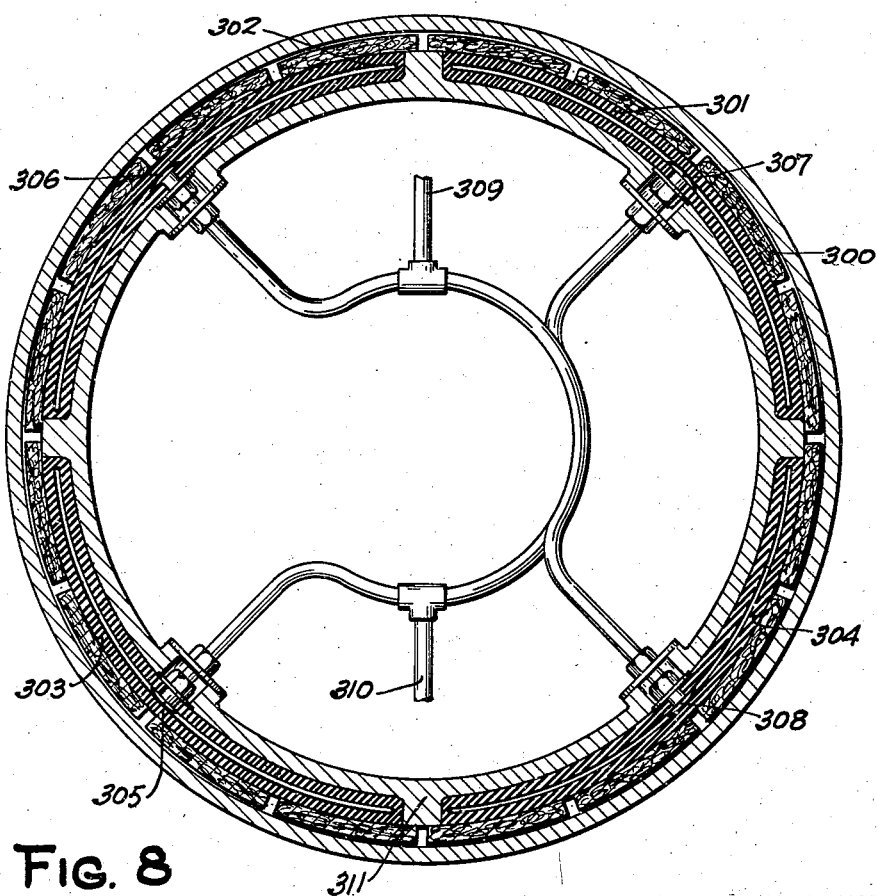
Figure 8 is a vertical section of another form of tube type brake arranged to embody the idea of my invention.

Figure 8 shows still another modification of a tube type brake. In this modification, there are four rubber tubes 301, 302, 303 and 304. Each of these covers only approximately one-quarter of the entire periphery of a rim 311. Rubber tubes 301, 302, 303 and 304 each has an inlet 307, 306, 305 and 308 respectively as an entrance for fluid. Inlets 305 and 307 are furnished fluid by a common source through a conduit 310 and inlets 308 and 306 are furnished fluid by a common source through conduit 309. Short segments of brake linings 300 are set in the rim 311. These short segments of brake linings are placed immediately above one of the rubber tubes 301, 302, 303 or 304.

In the operation of the tube type brake shown in Figure 6, fluid under pressure enters the rubber tubes 255 and 254 by means of the inlets 252 and 260. The rubber tubes 254 and 255 therefore expand and force the relatively short lining segments 253 against the brake drum (not shown).

These modified tube type brakes (Figures 6, 7 and 8) may be hooked up in hydraulic brake systems as shown in Figures 2 and 3, replacing the twinplex brake now shown. If one tube or group of tubes should fail the brake is still operable by means of the other tube or group of tubes.

For instance, in Figure 9 there is a diagrammatic view in which the hydraulic brake system shown in Figure 2 is used with brakes of the type shown in Figure 8. In this figure, similar parts to those shown in Figures 2 and 8 are referred to by the same numerals as are used in Figures 2 and 8.

I claim:

1. In a fluid brake system comprising a plurality of brakes, a pair of brake shoes in each brake, a plurality of fluid actuators for each brake disposed between opposite ends of the said brake shoes, a fluid pressure means connected to each of said fluid actuators, and means to isolate any of said fluid actuators from the fluid pressure means when said fluid actuators fail.

2. In a fluid brake system comprising a plurality of brakes each having a plurality of individually shiftable brake shoes, a plurality of fluid actuators for each brake, a fluid pressure means connected to each of said fluid actuators, a pressure controlling means for each of said brakes, a safety valve placed between the fluid pressure means and each of said actuators of said brakes, said safety valves isolating any of said actuators that fail.

3. In a fluid pressure brake system comprising a plurality of brakes, a plurality of fluid actuators for each of said brakes, a separate fluid pressure means connected to each of said fluid actuators, and a pressure controlling means connected to each of said actuators of said brakes.

4. In a fluid brake, a plurality of expansible tube actuators, a fluid pressure producing means, an inlet connection from said fluid pressure means to each of said expansible tube actuators, and means for isolating any one of said inlet connections in case of failure in pressure in the associated tube actuator.

5. A fluid brake comprising a brake drum, a plurality of expansible tube actuators, a plurality of brake lining segments, a mounting rim for said expansible tube actuators and said brake lining segments, a fluid pressure means, connections from said fluid pressure means to an inlet for each of said expansible tube actuators, and means for isolating any one of said inlets in case of failure of pressure in any of the associated expansible tube actuators.

6. For an airplane, a pair of brakes, a plurality of individually shiftable brake shoes associated with each brake, a plurality of actuators for applying each of said brakes and for serving at times as anchors for said brake shoes, a pressure means, connections from said pressure means to each of said actuators, and means for isolating any one of said actuators in case of failure of pressure therein.

7. A braking system comprising a pump, a pair of brakes, a pair of connections from said pump, one leading toward each of said brakes, a pair of valves for controlling said brakes, one positioned in each of said connections, a pair of actuators for each of said brakes, a pair of branch connections leading from each of said first named connections to the actuators of each of said brakes respectively, and a safety valve device in each of said branch connections for isolating said branch connection and its associated actuator in case of failure of pressure in said actuator.

8. In a braking system, a drum, a pair of brake shoes associated with said drum each arranged to anchor independently at one end when the drum is rotating in one direction and each arranged to anchor independently at the other end when the drum is rotating in the other direction, a pair of cylinders, one positioned between each pair of adjacent ends of said brake shoes, means for creating hydraulic pressure, connections from said means to said pair of cylinders, and a pair of safety valves, one positioned in each of said connections so as to isolate each of said connections in case of failure of pressure in the associated wheel cylinder.

9. In a hydraulic braking system comprising a drum, a plurality of brake shoe segments positioned in said drum, a plurality of flexible tubes associated with said brake shoe segments for moving said segments into contact with said drum to accomplish braking, a plurality of connections, each one connected to one of said tubes, means for isolating each of said connections from the other in case of failure of pressure in the associated tube, and means for creating pressure associated with said connections.

10. In a braking system, a drum, a pair of brake shoes associated with said drum each arranged to anchor independently at one end when the drum is rotating in one direction and each arranged to anchor independently at the other end when the drum is rotating in the other direction, a pair of wheel cylinders, one positioned between each pair of adjacent ends of said brake shoes, means for creating hydraulic pressure comprising a pump and a valve for controlling the pressure supplied by said pump and distributing it to said wheel cylinders, connections from said means to said pair of cylinders, and a pair of safety valves positioned in said connections so as to isolate each of said connections in case of failure of pressure in the associated wheel cylinder.

11. In a hydraulic braking system comprising a drum, a plurality of brake shoe segments positioned in said drum, a plurality of flexible tubes associated with said brake shoe segments for moving said segments into contact with said drum to accomplish braking, a plurality of connections, each one connected to one of said tubes, means for isolating each of said connections from the other in case of failure of pressure in the associated tube, and means for creating pressure in said connections comprising a pump and a valve for controlling said pressure and distributing it to said tube connections for applying said brakes.

12. In a hydraulic braking system comprising a drum, a plurality of brake shoe segments positioned in said drum, a pair of flexible tubes arranged in parallel relationship and associated with said brake shoe segments for moving said segments into contact with said drum to accomplish braking, a plurality of connections, each one connected to one of said tubes, means for isolating each of said connections from the other in case of failure of pressure in the associated tube, and means for creating pressure associated with said connections, whereby said tubes cooperate normally to actuate said shoes, and whereby each of said tubes in case of failure of the other actuates said shoes independently.

13. In a hydraulic braking system comprising a drum, a plurality of brake shoe segments positioned in said drum, a plurality of flexible tubes each comprising a segment of a circle associated with said brake shoe segments for moving said segments into contact with said drum to accomplish braking, a plurality of connections, each one connected to one of said tubes, means for isolating each of said connections from the other in case of failure of pressure in the associated tube, and means for creating pressure associated with said connections.

HENRY H. KERR.

CERTIFICATE OF CORRECTION.

Patent No. 2,245,682.  June 17, 1941.

HENRY H. KERR.

It is hereby certified that error appears in the printed specification of the above numbered patent requiring correction as follows: Page 2, second column, line 7, after the word "fluid" insert --wheel--; page 3, second column, line 68, claim 6, strike out "a" before --pressure--; and that the said Letters Patent should be read with this correction therein that the same may conform to the record of the case in the Patent Office.

Signed and sealed this 28th day of April, A. D. 1942.

(Seal)

Henry Van Arsdale,
Acting Commissioner of Patents.